(12) United States Patent
Wheeler, II (10) Patent No.: US 12,145,669 B2
(45) Date of Patent: Nov. 19, 2024

(54) SINGLE POINT HITCH BED SYSTEM

(71) Applicant: Samuel Scott Wheeler, II, Weaverville, NC (US)

(72) Inventor: Samuel Scott Wheeler, II, Weaverville, NC (US)

( * ) Notice: Subject to any disclaimer, the term of this patent is extended or adjusted under 35 U.S.C. 154(b) by 579 days.

(21) Appl. No.: 17/502,655

(22) Filed: Oct. 15, 2021

(65) Prior Publication Data

US 2022/0119047 A1 Apr. 21, 2022

Related U.S. Application Data (60) Provisional application No. 63/092,162, filed on Oct. 15, 2020.

(51) Int. Cl.
*B62D 53/08* (2006.01)
*B60D 1/48* (2006.01)

(52) U.S. Cl.
CPC ........... *B62D 53/0807* (2013.01); *B60D 1/48* (2013.01); *B62D 53/0857* (2013.01)

(58) Field of Classification Search
CPC ............................. B60D 1/48; B62D 53/0807
See application file for complete search history.

(56) References Cited

U.S. PATENT DOCUMENTS

| | | | | |
|---|---|---|---|---|
| 3,893,713 A * | 7/1975 | Ivy | ......................... | B60D 1/583 280/901 |
| 4,546,994 A * | 10/1985 | Taylor | ................ | B62D 53/0842 280/901 |
| 4,921,266 A * | 5/1990 | Beals | .................. | B62D 53/0828 280/495 |
| 5,246,244 A * | 9/1993 | Colibert | ............. | B62D 53/0828 280/901 |
| 6,158,761 A * | 12/2000 | King | ...................... | B60D 1/488 280/495 |
| 6,969,090 B1 * | 11/2005 | Works | .................... | B60D 1/488 280/901 |
| 9,415,648 B2 * | 8/2016 | McCall | .................. | B60D 1/485 |
| 10,406,873 B2 * | 9/2019 | Stanifer | ................. | B60D 1/015 |
| 10,766,322 B2 * | 9/2020 | McGory | ................ | B60D 1/485 |

FOREIGN PATENT DOCUMENTS

CA 2301462 A1 * 9/2000 ............... B60R 5/04

* cited by examiner

*Primary Examiner* — Kevin Hurley
(74) *Attorney, Agent, or Firm* — The Van Winkle Law Firm; William G. Heedy (57) ABSTRACT

A single point hitch bed system includes a base frame mounted on a truck bed, the base frame having a front end positioned towards the front of the truck, a rear end opposite the front end, and lateral side ends; a stationary upper deck permanently attached above the base frame; and an extendable lower deck positioned between the stationary upper deck and base frame, wherein the extendable lower deck is mounted via a rail system that allows the extendable lower deck to be extended to an adjustable length. An access hole is positioned towards the front of the stationary upper deck to allow access to a single point hitch that may be permanently secured to the truck. The single point hitch may receive removable components for securing cargo or towed apparatus to the truck. Auxiliary anchor points are positioned atop the base frame, laterally to the stationary upper deck.

19 Claims, 12 Drawing Sheets

SINGLE POINT HITCH BED SYSTEM

RELATED APPLICATION

This application claims priority to and incorporates entirely by reference U.S. Provisional Patent Application Ser. No. 63/092,162, filed Oct. 15, 2020, entitled "Single Point Hitch Extendable Bed System."

FIELD OF THE INVENTION

This invention relates to a single point hitch bed system for providing a single point attachment system, extendable truck bed, and modular, customizable accessories and anchoring points.

BACKGROUND OF THE INVENTION

Many truck beds include a rudimentary hitch system to allow for towing and/or hauling items, accessories, and/or trailers, yet many of these hitch and storage solutions have a limited scope of potential use and fail to provide users' desired modularity and interchangeability.

Therefore, there exists a need for a single point hitch system that is easy to use with a wide range of removable ball hitch systems while also maximizing the amount of available space in a truck bed and providing secure load securing points and an extendable capacity.

SUMMARY

In accordance with one form of the present invention, there is provided a single point hitch bed system including a base frame having a front end and a rear end, with an attachment mechanism for securing the system to an existing truck bed, including a bed with a standard or reversible, flippable trailer ball. The base frame has an access hole for accessing the single point hitch where accessories may be attached and detached, including standard trailer hitch balls, upright cargo holders, winch mounts, or other similar apparatuses. The access hole also provides access to the locking system and safety chain attachment points. The base frame has a number of auxiliary anchor points for securing loads to the truck bed with tie downs or straps. A stationary upper deck is attached to the top of the base frame to provide a stationary bed surface in the truck bed, and the stationary upper deck includes a substantially horizontal surface. The base frame includes a base frame railing system configured to support an extendable lower deck. The extendable lower deck is housed between the stationary upper deck and the base frame. The extendable lower deck is mounted on a railing system so that the lower deck may slide out from beneath the stationary upper deck, thus providing an extended truck bed surface. The extended truck bed surface may be used for transporting longer items that may not fit inside a standard-size truck bed, and it may provide additional anchor points for securing a load. The lower deck rail is configured to be engaged with the base frame railing system, wherein the lower deck rail and the base frame railing system permit the extendable lower deck to be extended rearward from the base frame and to be retracted frontward into the base frame.

In accordance with one form of the present invention, there is provided a single point hitch bed system for use with a truck bed including a base frame having a front end and a rear end, the base frame including an attachment mechanism configured to attach the base frame to an existing truck bed; a base frame access hole; a single point hitch configured to receive at least one attachment accessory; hitch pin framing surrounding the single point hitch; hitch framing surrounding the hitch pin framing; a plurality of auxiliary anchor points positioned laterally to a stationary upper deck; a base frame railing system configured to support an extendable lower deck; the stationary upper deck located superior to the base frame, the stationary upper deck including a substantially horizontal upper deck surface; an upper deck access hole located concentrically to the base frame access hole; the extendable lower deck located superior to the base frame and inferior to the stationary upper deck, the extendable lower deck including a substantially horizontal lower deck surface; at least one lower deck rail supporting the lower deck surface; the at least one lower deck rail configured to be engaged with the base frame railing system, wherein the lower deck rail and the base frame railing system permit the extendable lower deck to be extended rearward from the base frame and to be retracted frontward into the base frame.

In accordance with one form of the present invention, there is provided a single point hitch bed system for use with a truck bed, the system including a base frame having a front end and a rear end, the base frame including an attachment mechanism configured to attach the base frame to an existing truck bed; a base frame access hole; a single point hitch configured to receive at least one attachment accessory; a plurality of auxiliary anchor points; a stationary upper deck located superior to the base frame, the stationary upper deck including a substantially horizontal upper deck surface; an upper deck access hole located concentrically to the base frame access hole.

DETAILED DESCRIPTION

In accordance with one form of the present invention, there is provided a single point hitch bed system including a base frame with an attachment mechanism for securing the system to an existing truck bed, including an existing truck bed with a hitch. The system has a front end located near the cab of the truck and a rear end located opposite the cab of the truck. The base frame has an access hole for accessing the single point hitch where accessories may be attached and detached, including standard trailer hitch balls, upright cargo holders, winch mounts, or other similar apparatuses. The access hole also provides access to the locking system and safety chain attachment points. The base frame has numerous auxiliary anchor points for securing loads to the truck bed with tie downs or straps.

A stationary upper deck is attached to the top of the base frame to provide a stationary bed surface in the truck bed. An extendable lower deck is mounted on a railing system so that the lower deck may slide out from beneath the stationary upper deck, thus providing an extended truck bed surface. The extended truck bed surface may be used for transporting longer items that may not fit inside a standard-size truck bed, and it may provide additionally anchor points for securing a load. The extendable lower deck may be adjustably secured in an extended position at different lengths so that a user may adjust the extended bed length.

Figure 1:
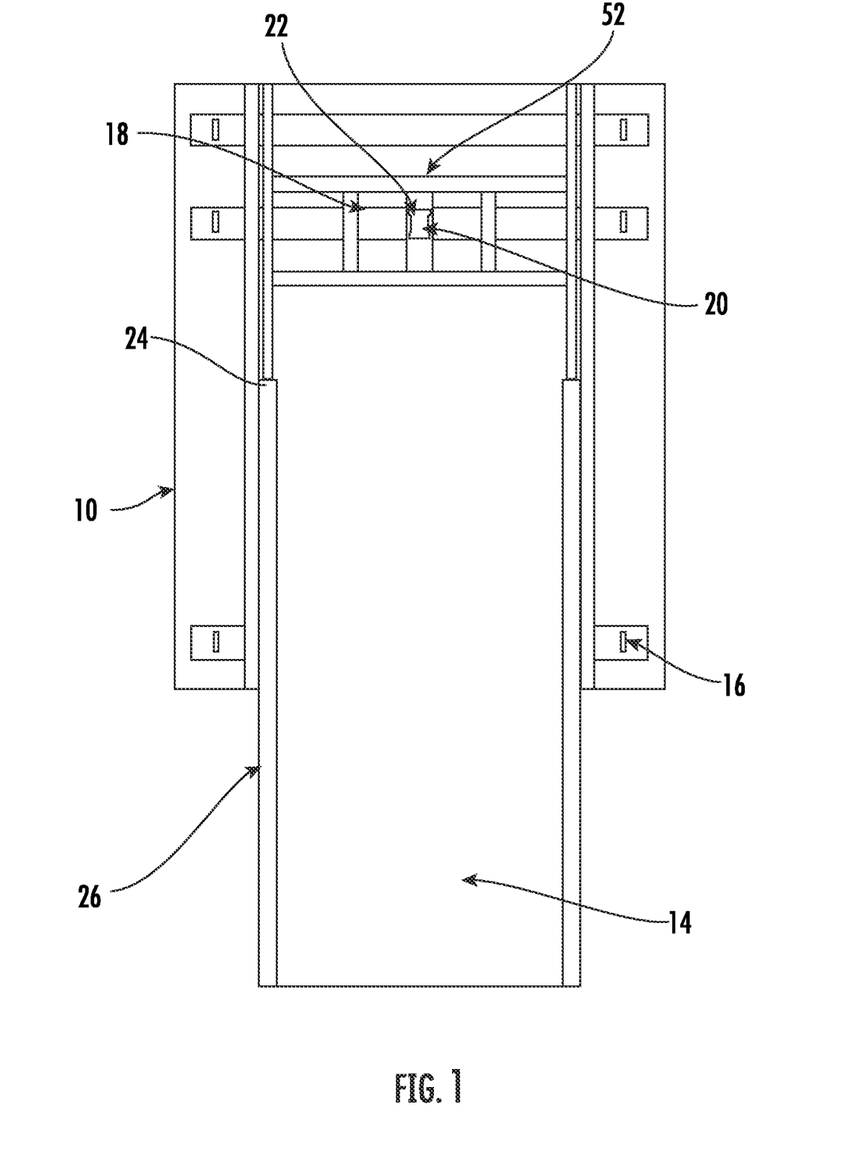
FIG. 1 is an overhead view of a single point hitch bed system in which the lower deck is extended.
Figure 2:
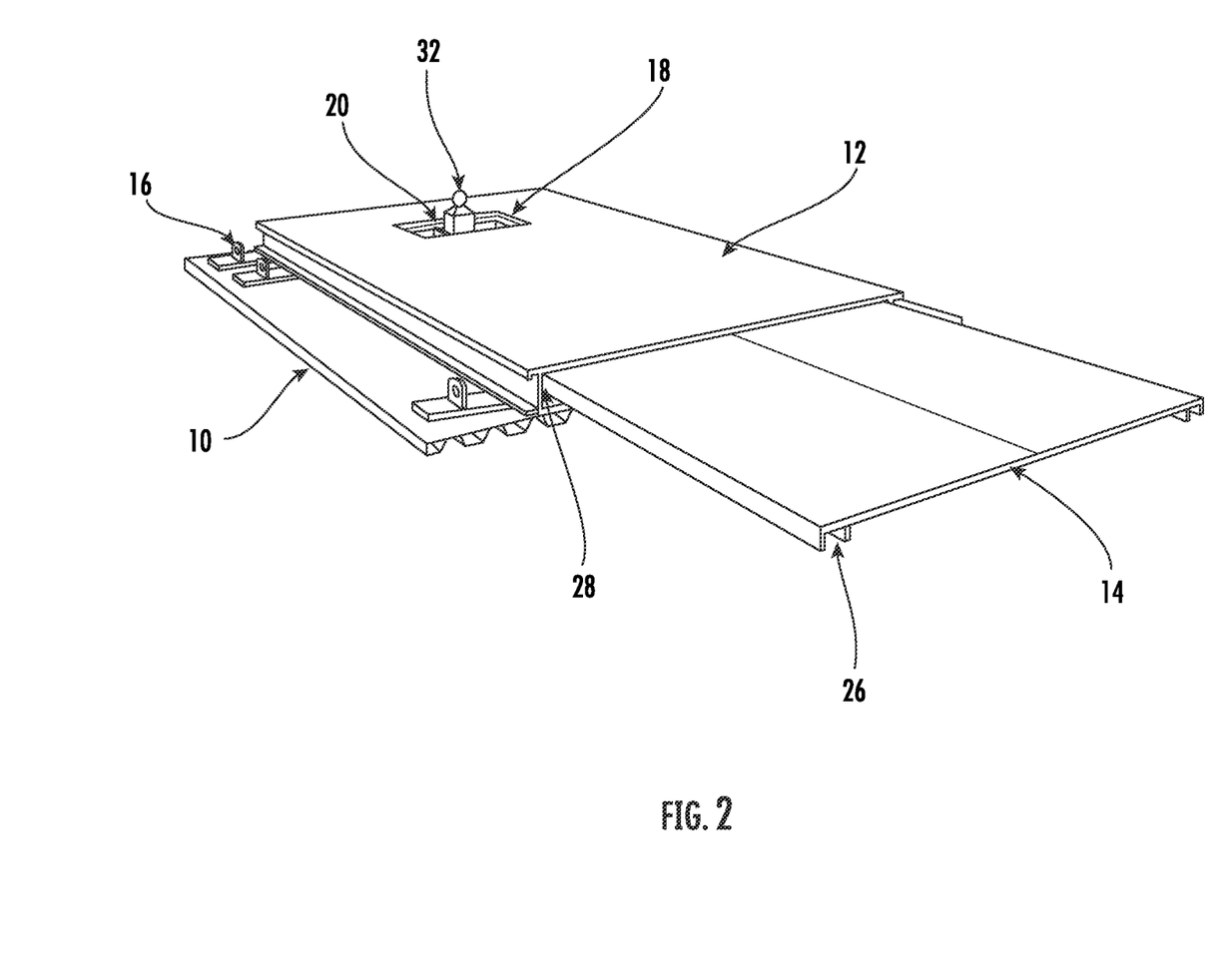
FIG. 2 is a projection view of a single point hitch bed system in which the lower deck is extended and a trailer hitch ball is attached to the single point hitch.
Figure 3:
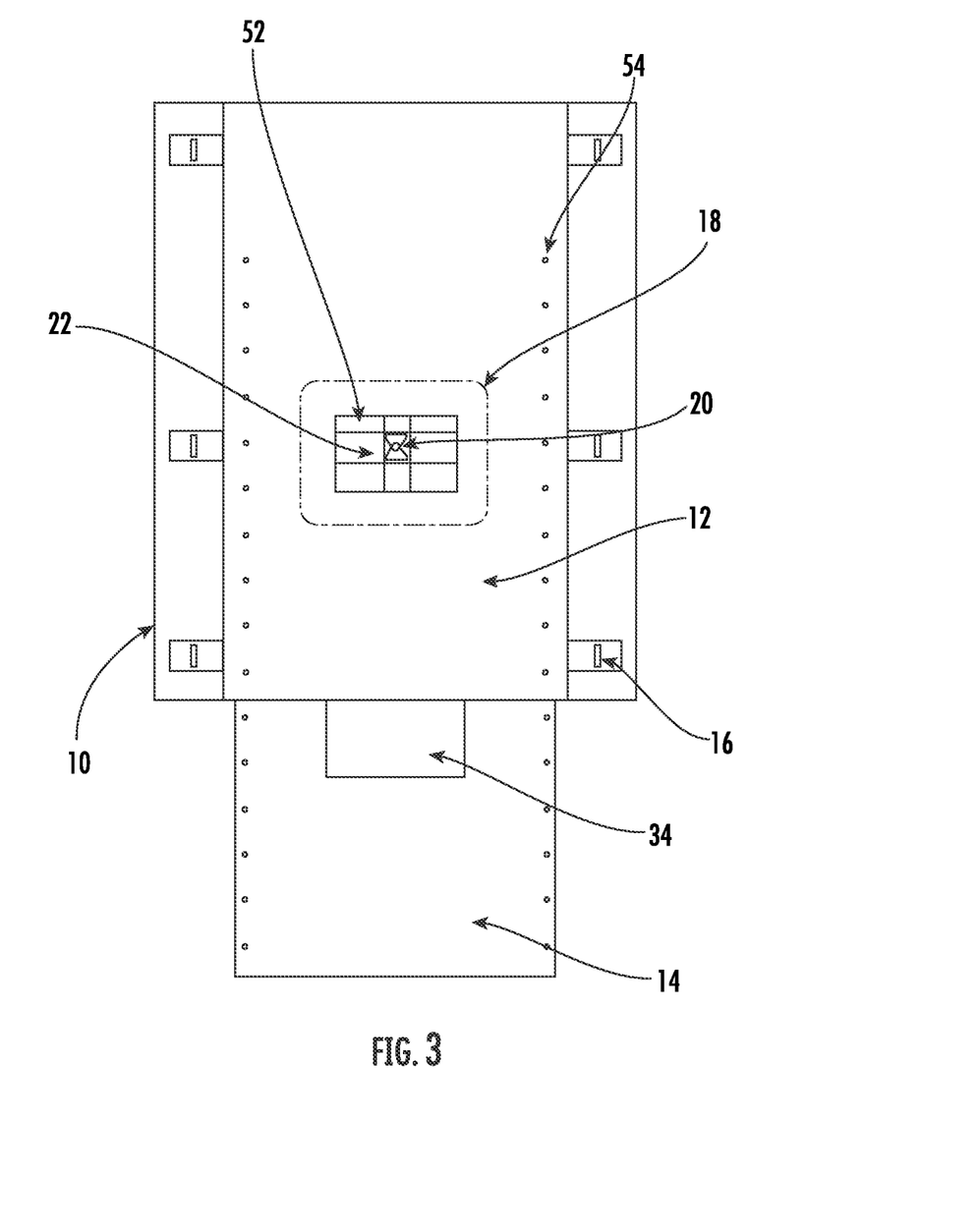
FIG. 3 is an overhead view of a single point hitch bed system in which the lower deck is extended.
Figure 4:
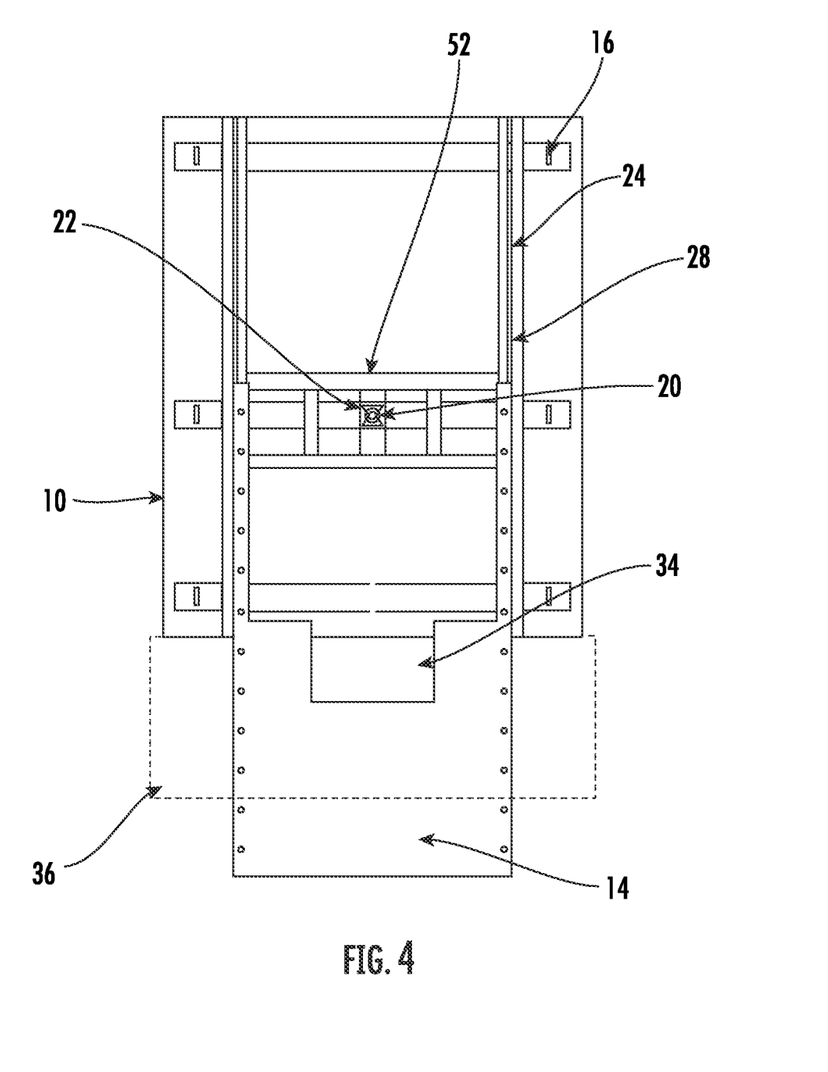
FIG. 4 is an overhead view of a single point hitch bed system in which the lower deck is extended and a standard truck tailgate is shown open in dashed line.

FIGS. 1, 3, 4 are overhead views of embodiments of a single point hitch bed system 100. For convenience of illustration, a stationary upper deck 12 is omitted from FIGS. 1 and 4 but is shown in one embodiment in FIG. 2 and FIG. 3. Base frame 10 is sized to fit in the bed of a standard truck, and it will be appreciated that base frame 10 may be sized and/or adapted to fit within the bed of different truck makes and models.

In one embodiment, base frame 10 is attached to a standard truck bed via a fifth wheel hitch receptor. Base frame 10 may also be attached to a standard truck bed via a fifth wheel rail system, a removable hitch ball, a flippable hitch ball, or similar mounting system.

Stationary upper deck 12 is permanently secured atop base frame 10 and contains an access hole 18, providing access to components beneath base frame 10. Stationary upper deck 12 is permanently affixed to base frame 10, which in turn, is secured to a standard truck bed.

Extendable lower deck 14 is positioned beneath stationary upper deck 12 and above base frame 10. The extendable lower deck 14 is mounted on a railing system 24, which allows extendable lower deck 14 to slide out rearwardly from beneath stationary upper deck 12. The railing system 24 may operate on a ball bearing rolling system, a rail system supported on rollers, or a sliding rail system supported by a non-stick or low-friction material, such as Teflon.

By sliding out extendable lower deck 14, a user is able to extend the length of a standard truck bed to haul longer items and to have additional points to secure a load in a hitch bed. Extendable lower deck 14 has a lower deck notch 34 that is sized so that when extendable lower deck 14 is retracted under stationary upper deck 12, the structure of extendable lower deck 14 will fit securely around the hitch framing 52.

Because stationary upper deck 12 is positioned above the extendable lower deck 14 and is permanently attached to base frame 10, a user is able to place loads directly onto stationary upper deck 12. This arrangement permits a user to haul heavier loads up to a truck's standard recommended limits.

The hitch framing 52 is shown near the front of the base frame and may be accessed through the access hole 18 of the stationary upper deck 12 as shown in FIG. 3. The hitch framing 52 surrounds the hitch pin framing 22 and single point hitch 20, which is constructed to receive removable and detachable implements, including trailer hitch balls, upright cargo holders, winch mounts, motorcycle carriers, hay bale spike, ladder rack, a holder for one or more flags, umbrellas, grills, crane, mounting plate, or other similar apparatuses.

Auxiliary anchor points 16 are mounted on base frame 10 and are located laterally from stationary upper deck 12 along the sides. In one embodiment, auxiliary anchor points 16 are standard u-bolts that are positioned to allow hooks, ropes, straps, or other securing implements to be connected to auxiliary anchor points 16. A user is thus able to secure a load within the bed of a truck by affixing the load to auxiliary anchor points 16 using hooks, ropes, straps, or other securing implements.

In one embodiment, a plurality of pin-receiving holes 54 are positioned along the lateral sides of stationary upper deck 12. Matching pin-receiving holes 54 are also positioned along the lateral sides of extendable lower deck 14, such that pin-receiving holes 54 may be aligned between the stationary upper deck 12 and extendable lower deck 14. When the pin-receiving holes 54 are thus aligned, a securing pin 46 may be inserted from above to secure the extendable lower deck 14 at a fixed length or when stored completely beneath the stationary upper deck 12. It will be appreciated that the pin-receiving holes 54 may be spaced at varying or uniform lengths to provide different adjustments for customizing the extended length of the extendable lower deck 14.

FIG. 2 is a projection view of an embodiment of a single point hitch bed system. FIG. 2 shows an extendable lower deck 14 extended from beneath stationary upper deck 12. In one embodiment, the underside of base frame 10 is flat and sits atop a standard truck bed. In another embodiment, the underside of base frame 10 has a corrugated mounting surface, shown as the underside of base frame 10, allowing base frame 10 to be fitted over a standard truck bed with a corrugated upper surface.

In an exemplary embodiment, a removable/flippable trailer hitch ball 32 is secured to a single point hitch 20, located within the access hole 18. Removable/flippable trailer hitch ball 32 allows a user to tow, for example, a goose-neck trailer or other similar towed device that may attached via a hitch ball.

Figure 5:
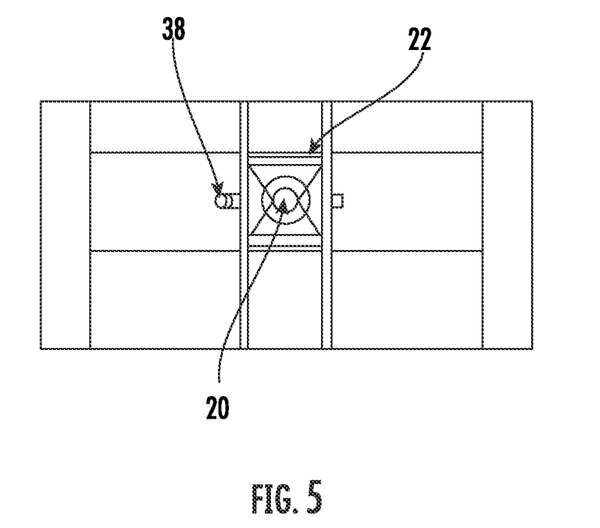
FIG. 5 is an overhead view of a hitch framing and single point hitch bed system.

FIG. 5 is an overhead view of an embodiment of a hitch framing 52 in a single point hitch bed system. Hitch pin framing 22 surrounds a single point hitch 20, and is capable of receiving detachable accessories, including standard trailer hitch balls, upright cargo holders, winch mounts, motorcycle carriers, hay bale spike, ladder rack, a holder for one or more flags, umbrellas, grills, crane, mounting plate, or other similar apparatuses.

Hitch pin 38 is inserted through a receiving hole in a detachable accessory to secure the accessory to the single point hitch 20 within the hitch pin framing 22. Hitch pin 38 may be secured in the receiving hole of a detachable accessory via a bolt with cotter pin or other similar hitch pin components.

Figure 6:
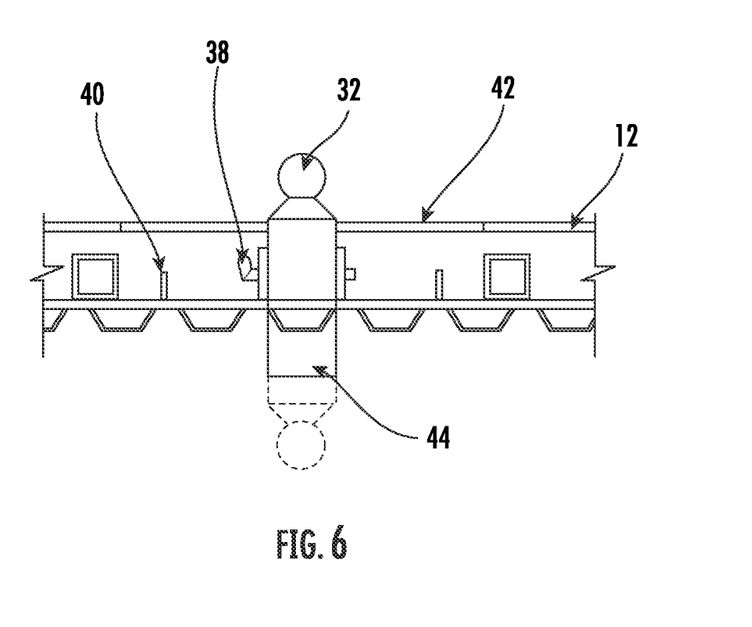
FIG. 6 is a cross-section view of an access hole, hitch framing, and single point hitch, including a reversible, removable trailer hitch ball.

FIG. 6 is a profile cross-section view of an access hole, hitch framing, and single point hitch, including a reversible, removable trailer hitch ball. A hinged access panel 42 may be made of the same or similar hard metal as the surrounding stationary upper deck 12, and in one embodiment, it is attached to the stationary upper deck 12 so that it may swing upward and open to allow access to the components in the access hole 18. Hinged access panel 42 fits over the access hole 18 when the single point hitch 20 is not in use, and it may be fastened closed using a latch mechanism, locking mechanism, or similar closure apparatuses. When a user desires access to the single point hitch 20 and other components inside the access hole 18, the hinged access panel may be swung upward and opened and rest on the stationary upper deck 12. A latching, locking, or similar mechanism may be used to secure the hinged access panel 42 in an open position when the single point hitch 20 is being accessed or used.

When the hinged access panel 42 is in the open position, a user may access the single point hitch 20 and other components contained within the access hole 18. In one embodiment, shown in FIG. 6, a trailer hitch ball 32 or gooseneck turnover ball mount 44 may be secured to the single point hitch 20. Such means of attachment may be, for example, via a hitch pin 38 or similar attachment mechanism standard in the industry.

Figure 7:
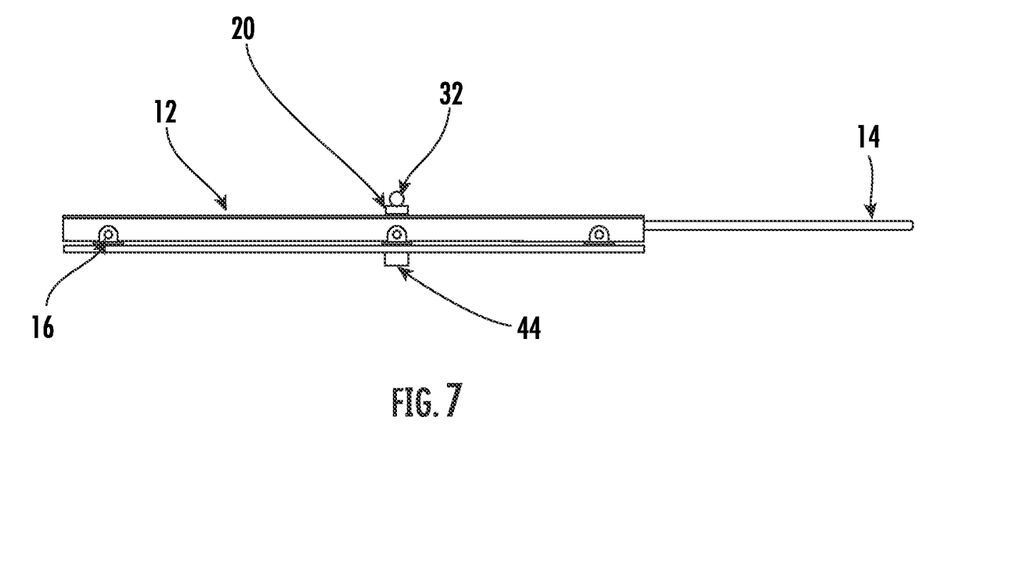
FIG. 7 is a side-profile view of a single point hitch bed system in which the lower deck is extended.
Figure 10:
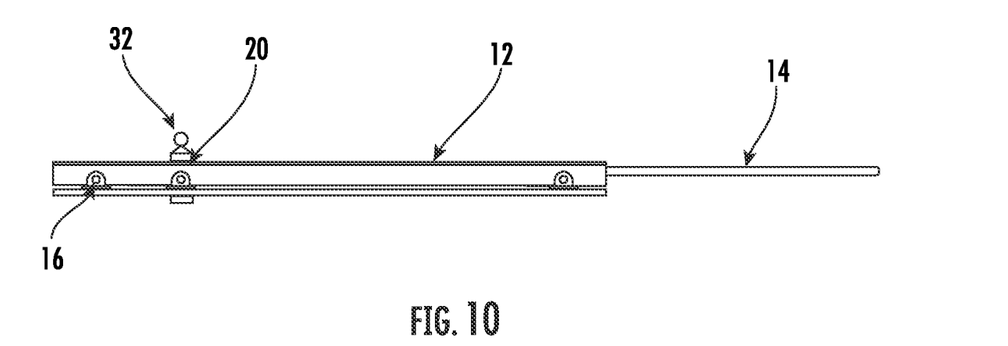
FIG. 10 is a side-profile view of a single point hitch bed system in which the lower deck is extended.

FIGS. 7 and 10 are side-profile views of embodiments of a single point hitch bed system in which the extendable lower deck 14 is extended. A plurality of auxiliary anchor points 16 are shown in the foreground, positioned lateral to the stationary upper deck 12. A removable/flippable trailer hitch ball 32 is shown extending out of the access hole 18 above the surface of the stationary upper deck 12.

FIG. 7 and FIG. 10 show the removable/flippable trailer hitch ball 32 in different positions relative to the front and rear of the invention. It will be appreciated that the access hole 18, and therefore the single point hitch 20, may be constructed in different positions to accommodate the location of the attachment point in different makes and models of truck beds.

Figure 8:
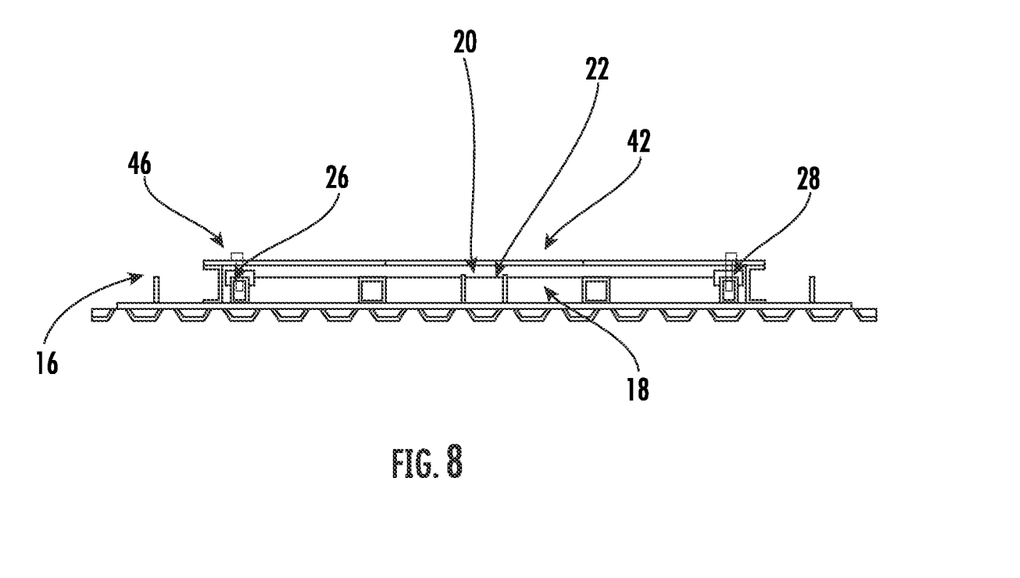
FIG. 8 is a cross-section view of an access hole, hitch framing, and single point hitch in a single point hitch bed system.

FIG. 8 is a cross-section view of an access hole 18, hitch pin framing 22, and single point hitch 20 in a single point hitch bed system. It will be appreciated that the cross-section view may be from the perspective of either the forward or rearward of the invention. Hinged access panel 42 is shown flush with stationary upper deck 12, providing access to an access hole 18 and a single point hitch 20.

In one embodiment, the railing system 24 includes a deck rail channel 28, a lower deck rail 26, and a securing pin 46. The lower deck rail 26 may be supported by and extend on a ball bearing rolling system, a rail system supported on rollers, or a sliding rail system supported by a non-stick or low-friction material, such as Teflon. Lower deck rail 26 may contain vertically oriented pin-receiving holes 54 that align with pin-receiving holes 54 in stationary upper deck 12, such that a securing pin 46 may be inserted from above, downwards through the pin-receiving hole 54 in the stationary upper deck 12 and into the lower deck rail 26.

In one embodiment, a plurality of pin-receiving holes 54 are positioned along the lateral sides of stationary upper deck 12. Matching pin-receiving holes 54 are also positioned along the lateral sides of extendable lower deck 14, such that pin-receiving holes 54 may be aligned between the stationary upper deck 12 and extendable lower deck 14.

When the pin-receiving holes 54 are thus aligned, a securing pin 46 may be inserted from above to secure the extendable lower deck 14 at a fixed length or when stored completely beneath the stationary upper deck 12. It will be appreciated that the pin-receiving holes 54 may be spaced at varying or uniform lengths to provide different adjustments for customizing the extended length of the extendable lower deck 14.

Figure 9:
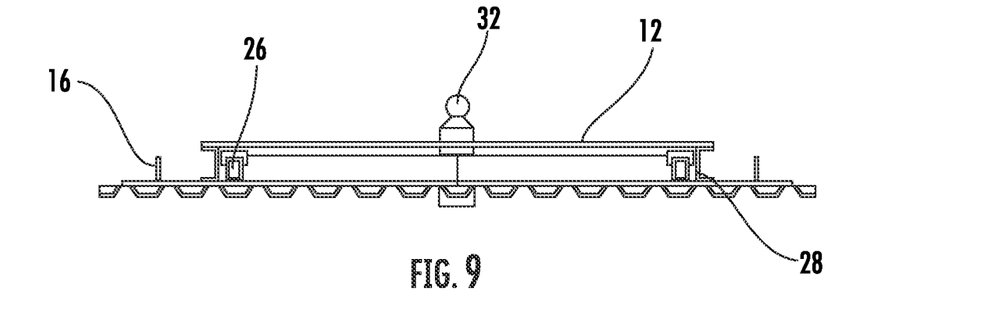
FIG. 9 is a rear-profile view of a single point hitch bed system.

FIG. 9 is a rear-profile view of a single point hitch bed system 100. A removable/flippable trailer hitch ball is shown extending out of the access hole 18 above the surface of the stationary upper deck 12. A plurality of auxiliary anchor points 16 are located laterally along the sides of the invention. The railing system 24 as shown, includes a deck rail channel 28, a lower deck rail 26, and a securing pin 46 not shown in FIG. 9.

Figure 11:
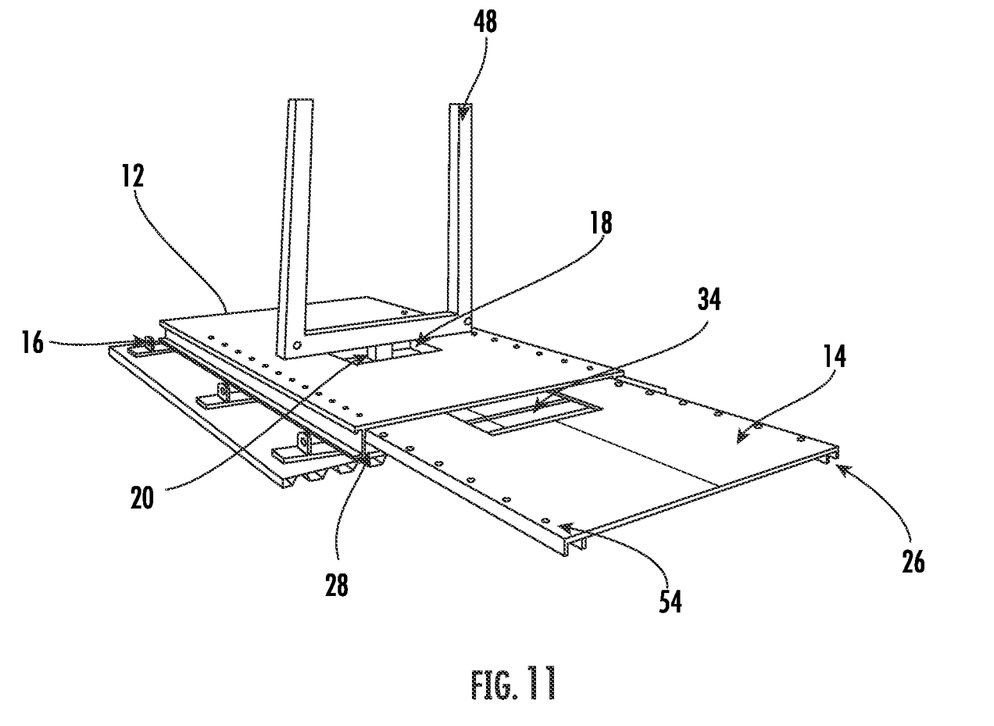
FIG. 11 is a profile view of a single point hitch bed system in which the lower deck is extended and a vertical frame is attached at the single point hitch.

FIG. 11 is a profile view of a single point hitch bed system in which the extendable lower deck 14 is extended and a vertical support frame with single channel 48 is attached at the single point hitch 20. The vertical support frame with single channel 48 may be used for carrying a variety of cargo types, including but not limited to paddle boards, surf boards, kayaks, bicycles, canoes, inner tubes, rafts, and general cargo or luggage. Vertical support frame with single channel 48 may also serve itself as an anchor point for securing large items, such as refrigerators, washing machines, dryers, propane bottles, and similar items which a user may be unable to easily secure in a standard truck bed. It will be appreciated that the vertical support frame may come in a variety of shapes in order to accommodate and secure many types of cargo, including but not limited to those listed above.

Figure 12:
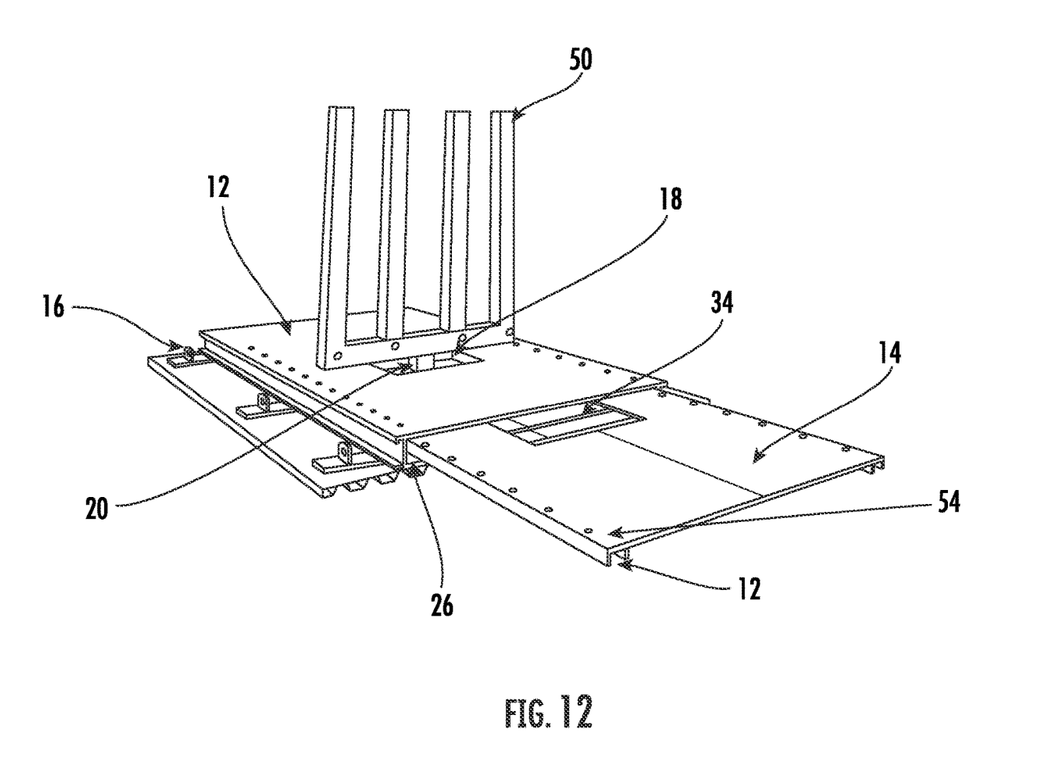
FIG. 12 is a projection view of a single point hitch bed system in which the lower deck is extended and a vertical frame is attached at the single point hitch.

FIG. 12 is a profile view of a single point hitch bed system in which the extendable lower deck 14 is extended and a vertical support frame with multiple channels 50 is attached at the single point hitch 20. The vertical support frame with multiple channels 50 may be used for carrying a variety of cargo types, including but not limited to paddle boards, surf boards, kayaks, bicycles, canoes, inner tubes, rafts, and general cargo or luggage. Vertical support frame with multiple channels 50 may also serve as an anchor point for securing large items, such as refrigerators, washing machines, dryers, propane bottles, and similar items which a user may be unable to easily secure in a standard truck bed. It will be appreciated that the vertical support frame may come in a variety of shapes in order to accommodate and secure many types of cargo, including but not limited to those listed above.

It will be appreciated that the vertical support frame may come in many different sizes and configurations. The single point hitch 20 may also be capable of receiving alternative components, including but not limited to standard trailer hitch balls, upright cargo holders, winch mounts, motorcycle carriers, hay bale spike, ladder rack, a holder for one or more flags, umbrellas, grills, crane, mounting plate, or other similar apparatuses.

Figure 13:
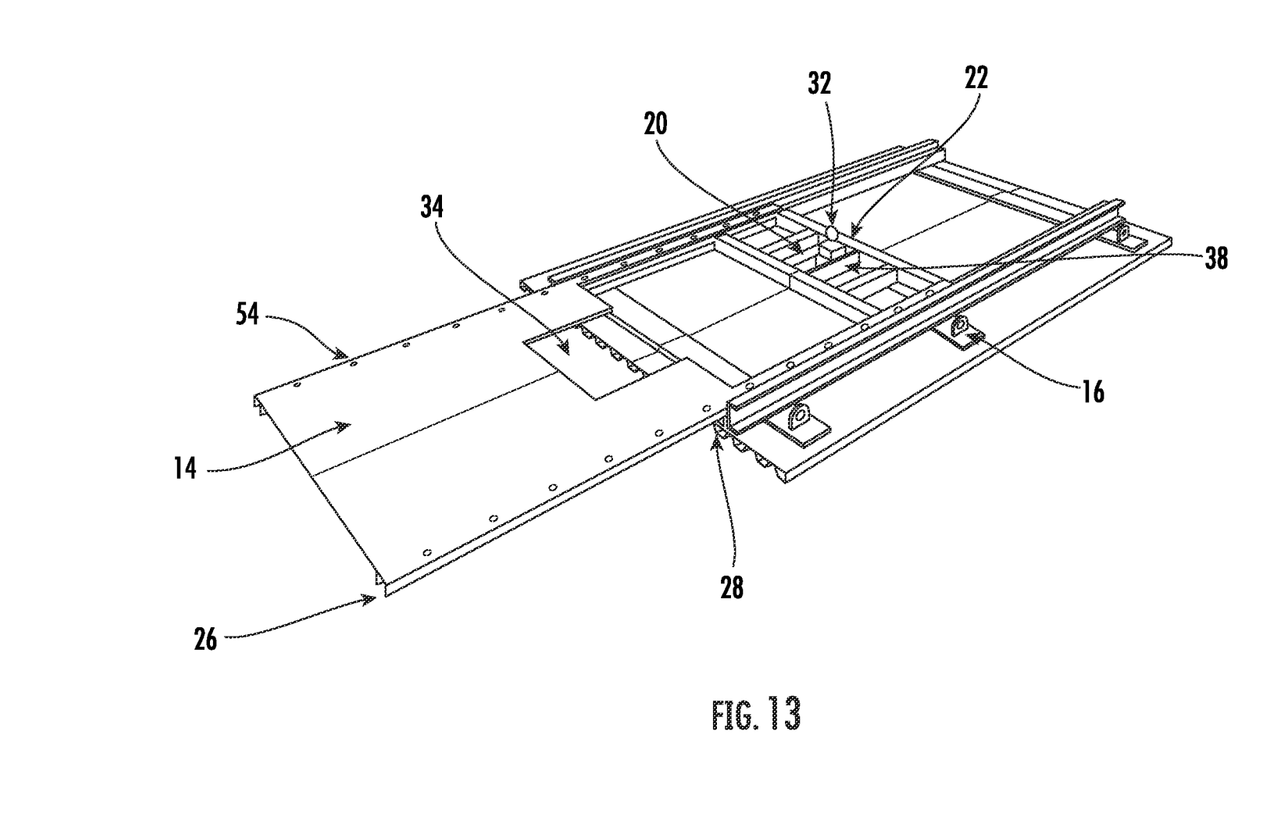
FIG. 13 is a projection view of a single hitch bed system in which the lower deck is extended and a trailer hitch ball is attached to the single point hitch.

FIG. 13 is a profile view of a single hitch extendable bed system in which the extendable lower deck 14 is extended and a trailer hitch ball 32 is attached to the single point hitch 20. For convenience of illustration, the stationary upper deck 12 is not shown. Extendable lower deck 14 is shown in an extended position, and in one embodiment the extendable lower deck 14 may be secured in different extended positions via securing pins 46 inserted downward through pin-receiving holes 54 in the stationary upper deck 12 and the extendable lower deck 14 to secure the decks in a stationary position.

Figure 14:
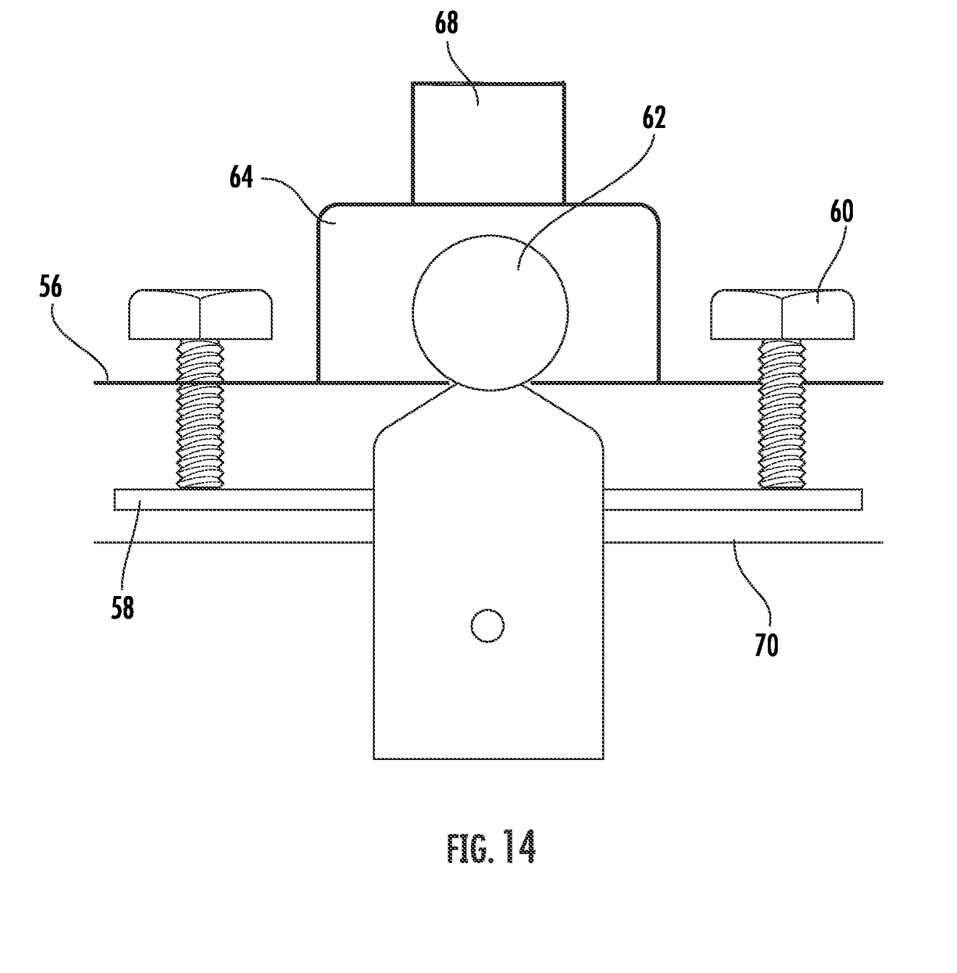
FIG. 14 is a profile view of a single hitch bed system, according to one embodiment.

FIG. 14 is a profile view of one embodiment of a single hitch bed system in which an upper plate 56 is secured to a lower plate 58 by at least one tightening pin 60. It will be appreciated by one of ordinary skill in the art that the tightening pin 60 may be a screw, cotter pin, or other similar securing device. In this embodiment, the single point hitch 20 is configured to receive, for example, a standard hitch ball 62. A coupler 64 is configured for attachment to the standard hitch ball 62. For example, the coupler 64 may be configured to fit around the standard hitch ball 62 and to be secured around the lowermost area of the standard hitch ball 62. Additionally, the coupler 64 may be secured to the standard hitch ball 62 via bolts 66 inserted into the coupler 64 when it is attached to the standard hitch ball 62.

According to this embodiment, an attachment accessory 68 may be attached directly to the coupler 64, or alternatively, the coupler 64 may be integrated with the attachment accessory 68, such that each attachment accessory 68 includes a coupler 64 that may be attached to the standard hitch ball 62, thus securing the attachment accessory 68 to a truck bed 70. The attachment accessory 68 may be of many different types of truck bed attachment accessories, including but not limited to upright cargo holders, winch mounts, motorcycle carriers, hay bale spike, ladder rack, a holder for one or more flags, umbrellas, grills, crane, mounting plate, or other similar apparatuses.

Figure 15:
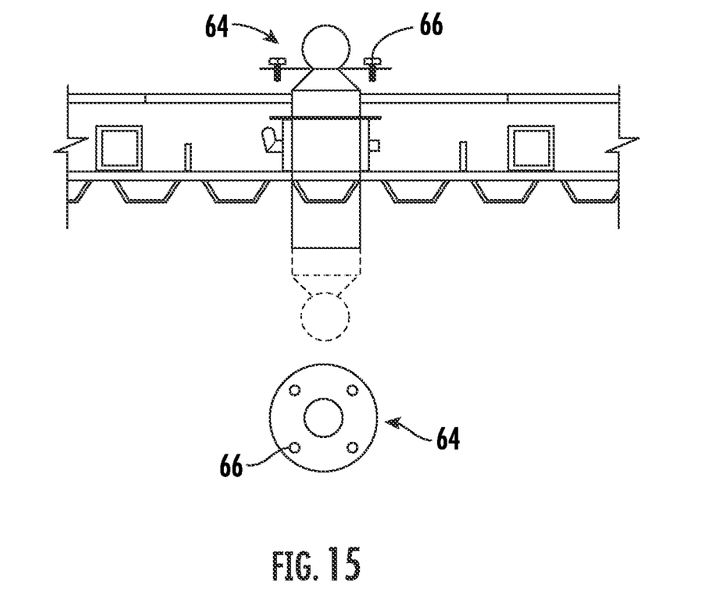
FIG. 15 is a profile and overhead view of a coupler in a single hitch bed system, according to one embodiment.

FIG. 15 is a profile and overhead view of one embodiment of the coupler 64, showing a plurality of bolts 66 that may be utilized for securing the coupler 64 to, for example, a standard hitch ball 62.

The dimensions and materials specified herein are preferred, but not mandatory, and different dimensions or materials may be used, as desired or necessary for a particular environment.

Thus, a single point hitch bed system has been described which includes a base frame mounted on a truck bed, the base frame having a front end positioned towards the front of the truck, a rear end opposite the front end, and lateral side ends; a stationary upper deck permanently attached above the base frame; and an extendable lower deck positioned between the stationary upper deck and base frame, wherein the extendable lower deck is mounted via a rail system that allows the extendable lower deck to be extended to an adjustable length. An access hole is positioned towards the front of the stationary upper deck to allow access to a single point hitch that may be permanently secured to the truck. The single point hitch is capable of receiving removable components for securing cargo or towed apparatus to the truck. Auxiliary anchor points are positioned on top of the base frame, laterally to the stationary upper deck.

What is claimed is:

1. A single point hitch bed system for use with a truck bed, the system comprising:
   a base frame having a front end and a rear end, the base frame comprising:
      an attachment mechanism configured to attach the base frame to an existing truck bed;
      a base frame access hole;
      a single point hitch configured to receive at least one attachment accessory;
      a plurality of auxiliary anchor points;
      a base frame railing system configured to support an extendable lower deck;
   a stationary upper deck located superior to the base frame, the stationary upper deck comprising:
      a substantially horizontal upper deck surface;
      an upper deck access hole located concentrically to the base frame access hole;
   the extendable lower deck located superior to the base frame and inferior to the stationary upper deck, the extendable lower deck comprising:
      a substantially horizontal lower deck surface;
      at least one lower deck rail supporting the lower deck surface;
      the at least one lower deck rail configured to be engaged with the base frame railing system, wherein the lower deck rail and the base frame railing system permit the extendable lower deck to be extended rearward from the base frame and to be retracted frontward into the base frame.

2. The single point hitch bed system of claim 1, further comprising:
   the stationary upper deck including at least one upper deck pin-receiving hole;
   the extendable lower deck including at least one lower deck pin-receiving hole;
   wherein at least one upper deck pin-receiving hole is capable of alignment with at least one lower deck pin-receiving hole;
   wherein an aligned upper deck pin-receiving hole and lower deck pin-receiving hole are configured to receive a securing pin for securing the extendable lower deck at fixed lengths of extension relative to the stationary upper deck.

3. The single point hitch bed system of claim 1, further comprising:
   the extendable lower deck including a lower deck notch sized so as not to occlude the upper deck access hole when the extendable lower deck is fully retracted.

4. The single point hitch bed system of claim 1, further comprising:
   the stationary upper deck including a hinged access panel configured to selectively cover the access hole.

5. The single point hitch bed system of claim 1, further comprising:
   the attachment accessory is a standard trailer hitch ball.

6. The single point hitch bed system of claim 1, further comprising:
   the attachment accessory is a reversible trailer hitch ball.

7. The single point hitch bed system of claim 1, further comprising:
   the attachment accessory is an upright cargo holder.

8. A single point hitch bed system for use with a truck bed, the system comprising:
   a base frame having a front end and a rear end, the base frame comprising:
      an attachment mechanism configured to attach the base frame to an existing truck bed;
      a base frame access hole;
      a single point hitch configured to receive at least one attachment accessory;
      hitch pin framing surrounding the single point hitch;
      hitch framing surrounding the hitch pin framing;
      a plurality of auxiliary anchor points positioned laterally to a stationary upper deck;
      a base frame railing system configured to support an extendable lower deck;

the stationary upper deck located superior to the base frame, the stationary upper deck comprising:
a substantially horizontal upper deck surface;
an upper deck access hole located concentrically to the base frame access hole;
the extendable lower deck located superior to the base frame and inferior to the stationary upper deck, the extendable lower deck comprising:
a substantially horizontal lower deck surface;
at least one lower deck rail supporting the lower deck surface;
the at least one lower deck rail configured to be engaged with the base frame railing system, wherein the lower deck rail and the base frame railing system permit the extendable lower deck to be extended rearward from the base frame and to be retracted frontward into the base frame.

9. The single point hitch bed system of claim 8, further comprising:
the stationary upper deck including at least one upper deck pin-receiving hole;
the extendable lower deck including at least one lower deck pin-receiving hole;
wherein at least one upper deck pin-receiving hole is capable of alignment with at least one lower deck pin-receiving hole;
wherein an aligned upper deck pin-receiving hole and lower deck pin-receiving hole are configured to receive a securing pin for securing the extendable lower deck at fixed lengths of extension relative to the stationary upper deck.

10. The single point hitch bed system of claim 8, further comprising:
the extendable lower deck including a lower deck notch sized so as not to occlude the upper deck access hole when the extendable lower deck is fully retracted.

11. The single point hitch bed system of claim 8, further comprising:
the stationary upper deck including a hinged access panel configured to selectively cover the access hole.

12. The single point hitch bed system of claim 8, further comprising:
the attachment accessory is a standard trailer hitch ball.

13. The single point hitch bed system of claim 8, further comprising:
the attachment accessory is a reversible trailer hitch ball.

14. The single point hitch bed system of claim 8, further comprising:
the attachment accessory is an upright cargo holder.

15. A single point hitch bed system for use with a truck bed, the system comprising:
a base frame having a front end and a rear end, the base frame comprising:
an attachment mechanism configured to attach the base frame to an existing truck bed;
a base frame access hole;
a single point hitch configured to receive at least one attachment accessory;
a plurality of auxiliary anchor points;
a stationary upper deck located superior to the base frame, the stationary upper deck comprising:
a substantially horizontal upper deck surface;
an upper deck access hole located concentrically to the base frame access hole; and
the stationary upper deck including a hinged access panel configured to selectively cover the access hole.

16. The single point hitch bed system of claim 15, further comprising:
the attachment accessory is a standard trailer hitch ball.

17. The single point hitch bed system of claim 15, further comprising:
the attachment accessory is a reversible trailer hitch ball.

18. The single point hitch bed system of claim 15, further comprising:
the attachment accessory is an upright cargo holder.

19. The single point hitch bed system of claim 15, further comprising:
the attachment accessory is a winch mount.

\* \* \* \* \*